United States Patent
Mason et al.

(10) Patent No.: US 11,300,647 B2
(45) Date of Patent: Apr. 12, 2022

(54) LONG RANGE NAVIGATION SYSTEM HAVING DIRECT SEQUENCE SPREAD SPECTRUM (DSSS) RF SIGNAL

(71) Applicant: EAGLE TECHNOLOGY, LLC, Melbourne, FL (US)

(72) Inventors: Gary W. Mason, Rockledge, FL (US); William C. Adams, Jr., West Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 360 days.

(21) Appl. No.: 16/289,721

(22) Filed: Mar. 1, 2019

(65) Prior Publication Data

US 2020/0278416 A1  Sep. 3, 2020

(51) Int. Cl.
*G01S 1/24* (2006.01)
*G01S 5/06* (2006.01)
*G01S 1/30* (2006.01)
*G01S 1/20* (2006.01)

(52) U.S. Cl.
CPC .............. *G01S 1/245* (2013.01); *G01S 1/20* (2013.01); *G01S 1/24* (2013.01); *G01S 1/30* (2013.01); *G01S 5/06* (2013.01)

(58) Field of Classification Search
CPC ... G01S 1/245; G01S 5/06; G01S 1/20; G01S 1/24; G01S 1/30
See application file for complete search history.

(56) References Cited

U.S. PATENT DOCUMENTS

| 4,665,404 | A | 5/1987 | Christy et al. |
| 6,928,265 | B2 | 8/2005 | Johannessen |
| 7,626,544 | B2 | 12/2009 | Smith et al. |
| 7,859,464 | B2 | 12/2010 | Smith et al. |
| 2005/0046583 | A1 | 3/2005 | Richards |
| 2008/0088507 | A1 | 4/2008 | Smith et al. |
| 2010/0103989 | A1* | 4/2010 | Smith .............. G01S 1/042 375/150 |
| 2012/0086606 | A1* | 4/2012 | Mathews .......... G01C 21/165 342/461 |
| 2019/0377055 | A1* | 12/2019 | Offermans .......... H04W 12/02 |

FOREIGN PATENT DOCUMENTS

EP     0772813 B1 *  8/2008  .............. G01S 5/14

OTHER PUBLICATIONS

Pasupathy, "Minimum Shift Keying: A Spectrally Efficient Modulation", IEEE Communications Magazine, vol. 17, No. 4, Jul. 1979, pp. 14-22 (Year: 1979).*

(Continued)

*Primary Examiner* — Thomas M Hammond, III
(74) *Attorney, Agent, or Firm* — Allen, Dyer, Doppelt + Gilchrist, P.A.

(57) ABSTRACT

A long range navigation system may include radio frequency (RF) transmitter stations at fixed geographical locations, each having an RF transmitter and an RF modulator coupled to the RF transmitter, and configured to generate a direct sequence spread spectrum (DSSS) RF signal being spectrally shaped so that 99% of power from the RF transmitter is within the frequency range of 90-110 KHz. Movable RF receiver units each include an RF receiver and a demodulator coupled to the RF receiver configured to demodulate the DSSS RF signal to determine a position of the movable RF receiver unit.

27 Claims, 9 Drawing Sheets

(56) References Cited

OTHER PUBLICATIONS

Purba et al., "The Effect of Pulse Shaping QPSKon Bandwidth Efficiency", New Mexico State University, NMSU-ECE-97-009, Jun. 1997, pp. 1-80 (Year: 1997).*

Raab, Green Mountain Radio Research Company, "Spread-Spectrum Loran (Loran-E)" The Wild Goose Association, Proceedings of the Eleventh Annual Technical Symposium, Washington DC, Oct. 13-15, 1982, pp. 1-170 (Year: 1982).*

Swaszek et al., "Modernized eLoran: The Case for Completely Changing Chains, Rates, and Phase Codes," Proceedings of the 28th International Technical Meeting of The Satellite Division of the Institute of Navigation; Tampa, Florida; Sep. 2015; pp. 1409-1424.

Safar, "Analysis, Modelling and Mitigation of Cross-Rate Interference in Enhanced Loran," Doctoral Thesis; Czech Technical University in Prague; Aug. 2014; Abstract Only; 3 pages.

Warner et al., "Split Spread-Spectrum Technique for Flexible Use of Frequency Bands," IEE Proceedings—Radar, Sonar and Navigation; vol. 141, Issue 2; Apr. 1994; pp. 65-74; Abstract Only; 2 pages.

Raab, Green Mountain Radio Research Company; "Spread-Spectrum Loran (Loran-E)," The Wild Goose Association, Proceedings of the Eleventh Annual Technical Symposium; Washington DC; Oct. 13-15, 1982; pp. 1-170.

Simon, "Bandwidth-Efficient Digital Modulation with Application to Deep-Space Communications, Chapter 2: Constant Envelope Modulations," Feb. 2003; pp. 1-125.

Pasupathy, "Minimum Shift Keying: A Spectrally Efficient Modulation", IEEE Communications Magazine, vol. 17, No. 4, Jul. 1979, pp. 14-22.

Purba et al., "The Effect of Pulse Shaping QPSK on Bandwidth Efficiency", New Mexico State University, NMSU-ECE-97-009, Jun. 1997, pp. 1-80.

Gilley, "Digital Phase Modulation: A Review of Basic Concepts", Transcrypt International, Inc. Aug. 2003, pp. 1-29.

\* cited by examiner

LONG RANGE NAVIGATION SYSTEM HAVING DIRECT SEQUENCE SPREAD SPECTRUM (DSSS) RF SIGNAL

FIELD OF THE INVENTION

The present invention relates to the field of navigation and, more particularly, to a long range navigation system with an integral data communications channel and related methods.

BACKGROUND OF THE INVENTION

The LOng RAnge Navigation (LORAN) system was developed in the United States during World War II. Subsequent implementations provided for enhancements in accuracy and usefulness, including LORAN-C and later enhanced LORAN (eLORAN) implementations. The eLORAN system is a low frequency radio navigation system that operates in the frequency band of 90-110 kHz and includes transmissions that propagate by ground wave. The eLORAN system transmits LORAN type navigation RF pulses at a center frequency of about 100 kHz and differs from LORAN-C because eLORAN transmissions are synchronized to the UTC similar to GPS, and include time-of-transmission control, differential corrections similar to differential GPS, the use of "all-in-view" tracking, and one or more eLORAN data channels that provide low-rate data messaging, differential corrections, and almanac information.

With the rise of satellite-based navigation systems such as Global Positioning System (GPS), there has been relatively little development or investment in terrestrial-based navigation systems, such as the eLORAN system, until recently. A renewed interest in such systems has arisen as a backup for satellite based navigation and timing systems, particularly since low frequency eLORAN signals are less susceptible to jamming or spoofing compared to the relatively higher frequency and lower powered GPS signals.

The current version of the eLORAN system uses a standard land LORAN-C pulse waveform that was derived from the signal requirements and equipment limitations of the 1940's and of the 1950's, and incorporates a LORAN data channel (LDC) using a pulse position modulation (PPM), which is straightforward, but is less than optimal in terms of maximizing data throughput. There are technical drawbacks associated with this current pulse waveform used in eLORAN systems and its associated LORAN data channel. The eLORAN waveform requires a high power amplifier (HPA) for transmitting peak power up to 1 Megawatt and has poor peak-to-average power ratio and efficiency because only about five percent (5%) of the pulse energy is used for navigation. The eLoran pulse is susceptible not only to local man-made signal interference, but also to cross-rate interference (CRI) from adjacent eLoran chains and continuous wave interference (CWI). The eLORAN waveform requires its pulse to be tracked at the third RF cycle trailing zero crossing, and thus, it is susceptible to waveform distortions and sky wave interference. There is no inherent data carrying capability in the original Loran waveform, and thus, the eLORAN system requires that an additional LORAN data channel (LDC) be employed. The LDC is limited, however, by its low data rate capability. Therefore, a need exists for further developments in the eLORAN system to improve waveform characteristics to overcome these drawbacks.

SUMMARY OF THE INVENTION

In general, a long range navigation system may include a plurality of radio frequency (RF) transmitter stations at fixed geographical locations. Each RF transmitter station may comprise an RF transmitter and an RF modulator coupled to the RF transmitter and configured to generate a direct sequence spread spectrum (DSSS) (scrambled) RE signal being spectrally shaped so that 99% of power from the RF transmitter is within the allocated frequency range of 90-110 kHz. A plurality of movable RF units may each include an RF receiver and a demodulator coupled to the RF receiver and configured to demodulate the DSSS RF signal to determine a position of the movable RE receiver unit.

The RF modulator may be configured to implement minimum-shift keying (MSK). The RF modulator may also be configured to implement phase shift keying (PSK). The RF modulator may be configured to implement binary phase shift keying (BPSK), including in an example, root-raised-cosine (RRC) filtering. In another example, the RF modulator is configured to implement quadrature phase shift keying (QPSK), including root-raised-cosine filtering.

In some embodiments, the RF transmitter station may comprise encryption circuitry cooperating with the RF modulator. At least one of the movable RF receiver units may comprise decryption circuitry cooperating with the RF demodulator. Each RF transmitter station may further comprise a legacy RF modulator cooperating with the RF transmitter to generate legacy eLORAN signals. At least one of the movable RF receiver units may comprise a legacy RF demodulator cooperating with the RF receiver.

In yet another embodiment, a radio frequency (RF) transmitter station for a long range navigation system includes an RF transmitter and an RF modulator coupled to the RF transmitter and configured to generate a direct sequence spread spectrum (DSSS) RF signal being spectrally shaped so that 99% of power from the RF transmitter is within the frequency range of 90-110 kHz.

Another aspect is directed to a method for long range navigation control for a plurality of RF transmitter stations each comprising an RF transmitter and an RF modulator coupled to the RF transmitter. The method includes operating the RF modulator to generate a direct sequence spread spectrum (DSSS) RF signal being spectrally shaped so that 99% of power radiated from the RF transmitter is within the frequency range of 90-110 kHz.

DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
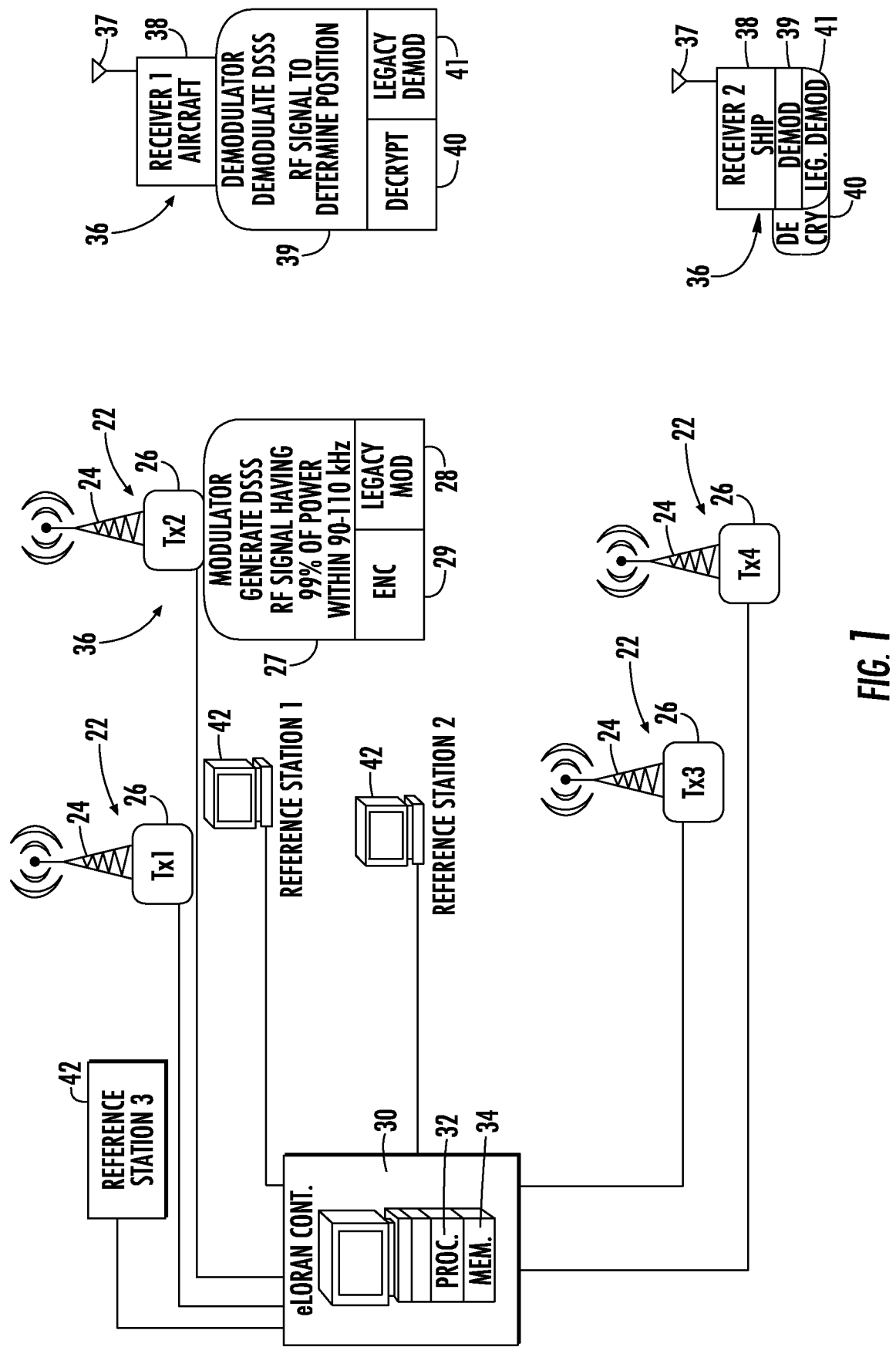
FIG. 1 is a schematic block diagram of a long range navigation system in accordance with an example embodiment.

Referring initially to FIG. 1, there is illustrated generally at 20 a long range navigation system that includes a plurality of radio frequency (RF) transmitter stations 22 at fixed geographical locations in this example. Each RF transmitter station 22 includes an RF antenna 24 and an RF transmitter 26 coupled to the antenna. Four RF transmitter station 22 are illustrated and labeled as TX1, TX2, TX3, and TX4, and as shown in the example of the RF transmitter stations 22 labeled TX2, each RF transmitter station includes a respective RF modulator 27 coupled to the RF transmitter 26 and configured to generate a direct sequence spread spectrum (DSSS) RF signal that is spectrally shaped so that 99% of power from the RE transmitter is within the frequency range of 90-110 kHz. This frequency range corresponds to the bandwidth of the pulse waveform associated with the enhanced LOng RAnge Navigation (eLORAN) system as a legacy system when associated with the DSSS RF signal. Each RF transmitter station 22 therefore also includes a legacy RF modulator 28 cooperating with the RF transmitter 26 to generate legacy eLORAN signals. Each RF transmitter station 22 also includes encryption circuitry 29 cooperating with the RF modulator 27 to encrypt the DSSS RF signals. The encryption circuitry 29 may also encrypt the legacy eLORAN signals in some examples. The RF modulator 27, legacy RF modulator 28, and encryption circuitry 29 may be associated with a controller having an associated processor and memory known to those skilled in the art.

Each RF transmitter station 22 is operatively connected to a control station 30 that includes a processor 32 and memory 34 coupled thereto and configured to generate specific data that are received by users operating movable RF receiver units 36, which could be located in an aircraft, ship, or terrestrial land vehicle, and illustrated schematically with Receiver 1 in an aircraft and Receiver 2 in a ship and Receiver 3 in a land vehicle.

Each movable RF receiver unit 36 includes a receive RE antenna 37 and RF receiver 38. A demodulator 39 is coupled to the RF receiver 38 and configured to demodulate the DSSS RF signal and determine a position of the movable RF receiver unit 36. Because some of the transmitted DSSS RF signals may be encrypted, each movable RF receiver unit 36 also includes decryption circuitry 40 cooperating with the demodulator 39. Some of the DSSS RF signals may be legacy eLORAN signals, and each RF receiver 38 also includes a legacy RF demodulator 41 cooperating with the RF receiver 38.

As will be explained in further detail below, the RF modulator 27 in each RF transmitter station 22 may be configured to generate the DSSS RF signal that is spectrally within the frequency range of 90-110 kHz, just 10 kHz away from the center frequency of 100 kHz for the LORAN carrier signal. This is accomplished by having the RF modulator 28 implement minimum-shift keying (MSK) or phase shift keying (PSK), such as binary phase shift keying (BPSK) and a root-raised-cosine filtering. In another example, the RF modulator 28 may implement quadrature phase shift keying (QPSK) and a root-raised-cosine filtering. Each movable RF receiver unit 36 may include a controller and associated processor and memory known to those skilled in the art that cooperate with the RF receiver 38, demodulator 39, legacy RE demodulator 41, and decryption circuitry 40 at the RF receiver unit 36.

The determination of the location of a movable RF receiver unit 36 is accomplished in a manner similar to location determination in conventional eLORAN systems and may include the employment of the differential correction data from reference stations 42, such as illustrated in FIG. 1, showing three reference stations indicated by reference station 1, reference station 2, and reference station 3. One of the reference stations 42 may operate as a differential reference station similar to a conventional differential eLORAN reference station and monitor the RF signals and process data related to the RF signals to determine differential corrections and transmit information regarding those DSSS RF signals via the control station 30.

Figure 2:
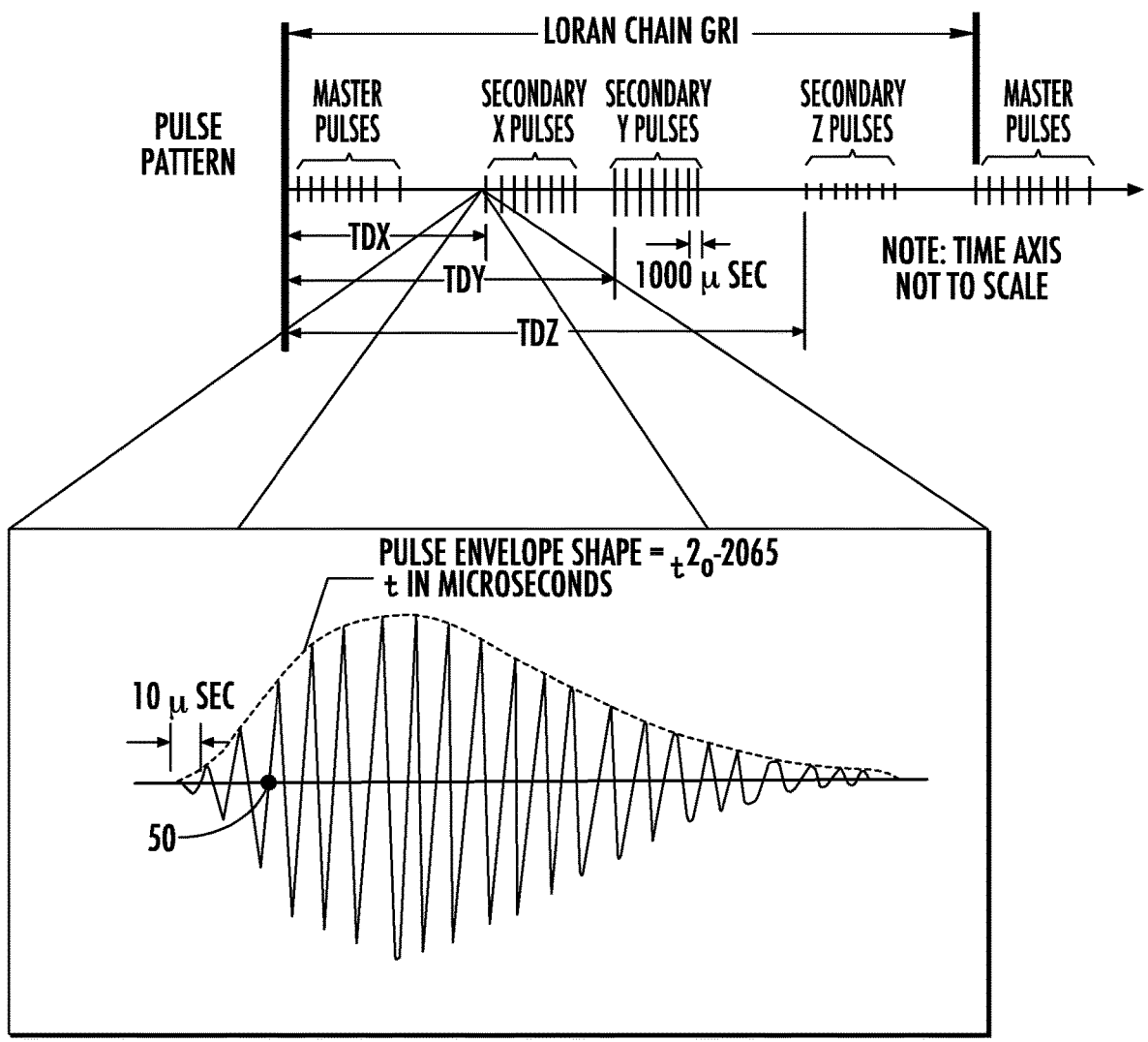
FIG. 2 is a graph of the current eLORAN pulse waveform and showing an example of the pulse pattern.
Figure 3:
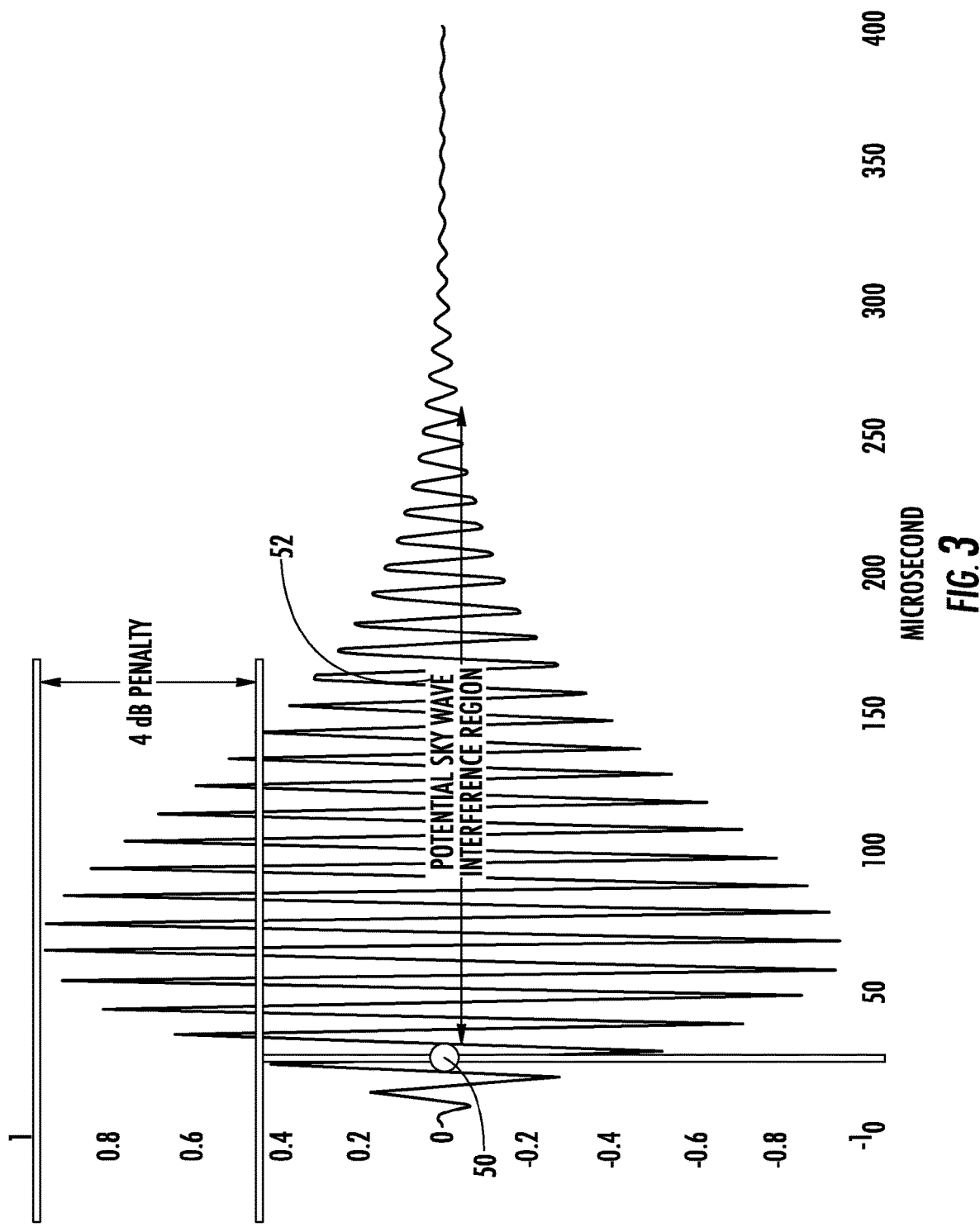
FIG. 3 is an enlarged view of the eLORAN pulse waveform of FIG. 2 showing the third RF cycle zero crossing where the pulse is tracked by the receiver.

Referring now to FIGS. 2 and 3, there are illustrated a current eLORAN pulse waveform and showing in FIG. 2 the overall pulse pattern in the LORAN chain group repetition interval (GRI) where the GRI includes the master pulses, secondary X pulses, secondary Y pulses, and secondary Z pulses for the repeating pulse pattern. In the graphs shown in both FIGS. 2 and 3, the pulse envelope shape is formed such that the pulse is tracked at the third RF cycle, zero crossing indicated by the dot 50 in FIGS. 2 and 3, where that third RF cycle zero crossing is identified. In the standard eLORAN system, this corresponds to about 30 microseconds from the beginning of the waveform as best shown in FIG. 2. Much of the remaining energy in the signal is unused power as shown with the 4 dB amplitude penalty in the waveform of FIG. 3. The potential sky wave interference region 52 is shown across the waveform in FIG. 3.

This current eLORAN pulse waveform shown in FIGS. 2 and 3 requires a high transmit power, has a high peak-to-average power ratio, and is susceptible to man-made noise and sky wave interference. Since the pulse is tracked at the third RF cycle zero crossing 50, there is a potential for sky wave interference to affect location tracking for an eLORAN receiver. Another drawback using the conventional eLORAN waveform is its low data rate communications capability. It also cannot support privatization as a tiered service. That conventional pulse waveform uses only about 5% of the received pulse energy to determine the positioning and timing solutions, and thus, much signal energy is unused, i.e., "wasted" energy.

As noted before, the exemplary long range navigation system 20 employs the RF modulator 27 at each RF transmitter station 22 to generate a DSSS RF signal that is spectrally shaped so that 99% of the power from the RF transmitter is within the frequency range of 90-110 kHz. This new waveform replaces the existing eLORAN pulse waveform shown in FIGS. 2 and 3. This is accomplished by having the RF modulator 28 implement minimum-shift keying (MSK) or phase shift keying (PSK) such as binary phase shift keying (BPSK) with root-raised-cosine filtering such that 99% of the spectral energy and power from the RF transmitter is within the allocated frequency range of 90-110 kHz, thus only 1% of signal power is outside the allocated bandwidth.

In addition to the binary phase shift keying with root-raised-cosine filtering, it is possible to implement quadrature phase shift keying (QPSK) with root-raised-cosine filtering to shape the waveform. The root-raised-cosine filtering with the BPSK/QPSK or the MSK spectral shaping addresses and complies with this eLORAN power spectrum constraint. The chip rate for implementing the direct sequence spread spectrum or RF signal should be as high as possible while meeting the spectral containment requirement having 99% of the waveform power within the 90-110 kHz allocated bandwidth. Using only an ideal (unshaped) BPSK/QPSK constant envelope modulation with the chip rates near the desired 10 kilochips per second (kcps) rate would result in inordinately high sidelobe levels far outside the main lobe, and thus, violate the spectral mask 99% constraint. A reduction in data rate is required, and therefore, the RF modulator optimizes or maximizes the permissible chip rate by spectrally shaping the waveform using the root-raised-cosine filtering with BPSK/QPSK, or alternatively, by using MSK modulation.

Figure 4:
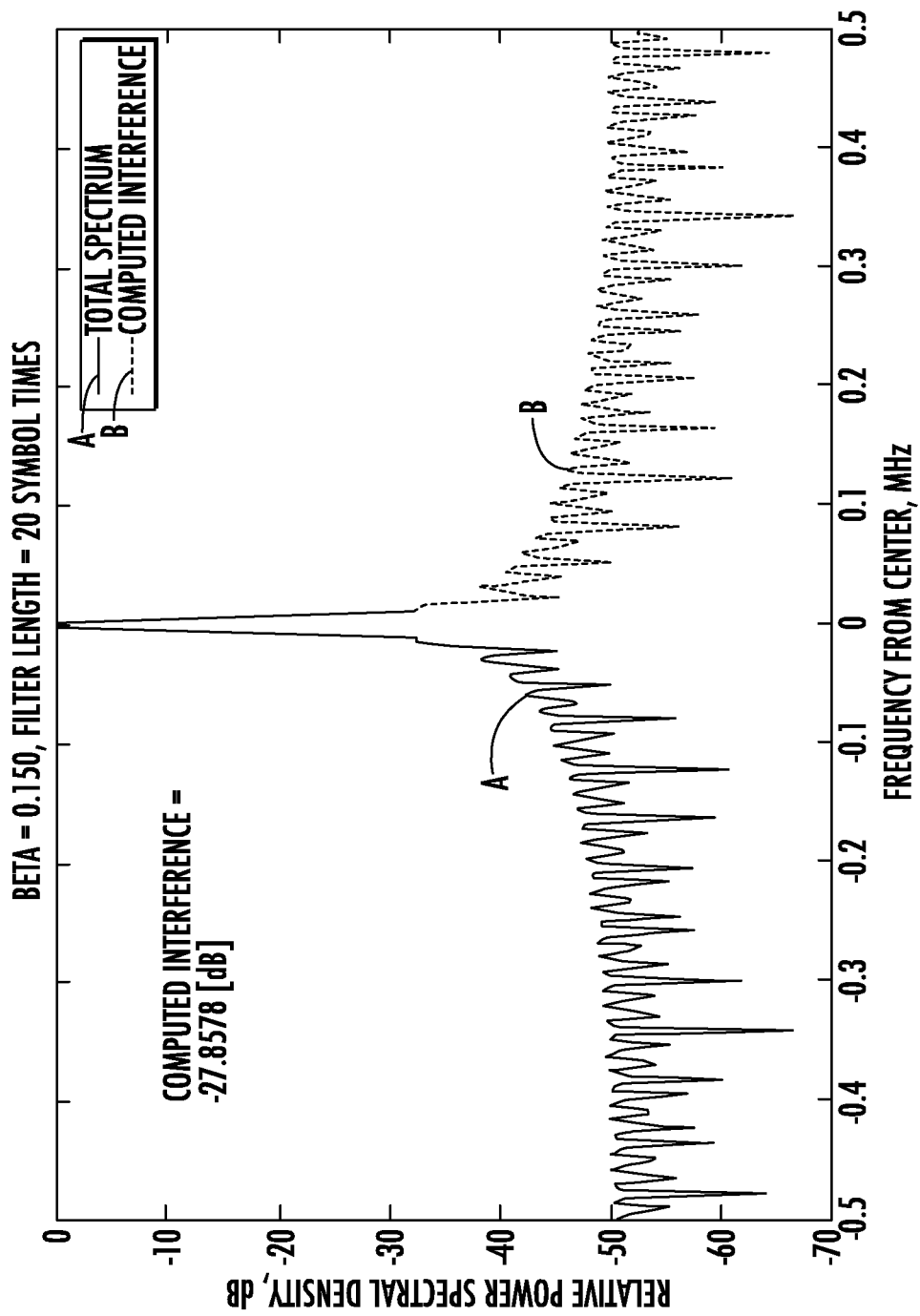
FIG. 4 is a graph showing the spectrum of the Direct Sequence Spread Spectrum (DSSS) RF signal in an example embodiment.
Figure 5:
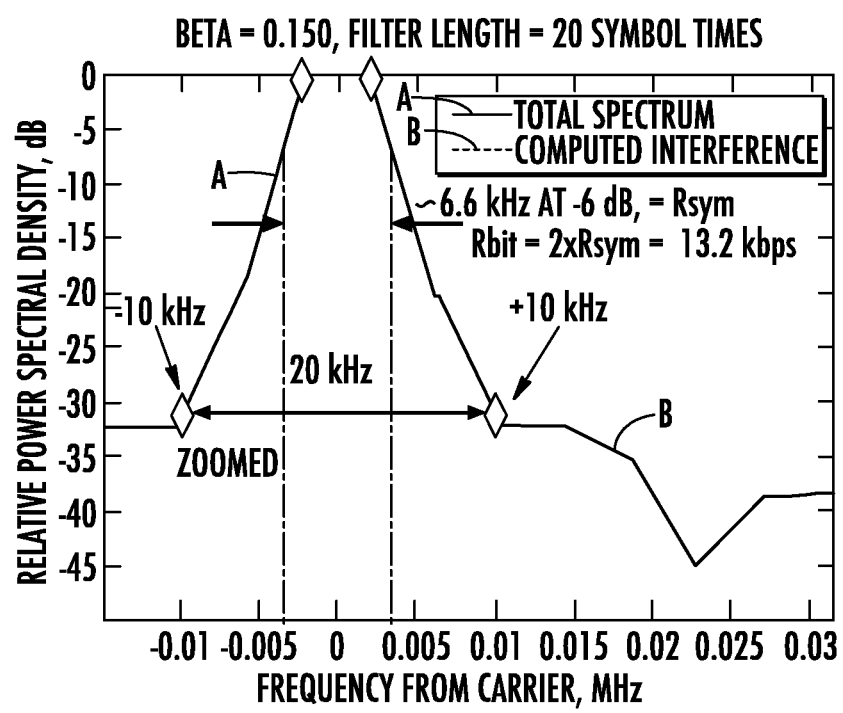
FIG. 5 is an enlarged view of a portion of the graph of FIG. 4 showing the DSSS RF signal spectrally shaped so that 99% of power is within a 20 kHz frequency range.

Referring now to the graphs shown in FIGS. 4 and 5, the total spectrum and computed interference of the DSSS RF signal are illustrated, showing most of the signal power is within the calculated −10 kHz and +10 kHz zone from the center frequency of about 100 kHz represented in FIGS. 4 and 5, as the zero frequency. The graph of FIG. 5 is an enlarged section of the center frequency region. The filter length in this example is about 20 symbol times. The graph shows a relative power spectral density in decibels (dB) relative to the change from center frequency in Megahertz (MHz).

Figure 6:
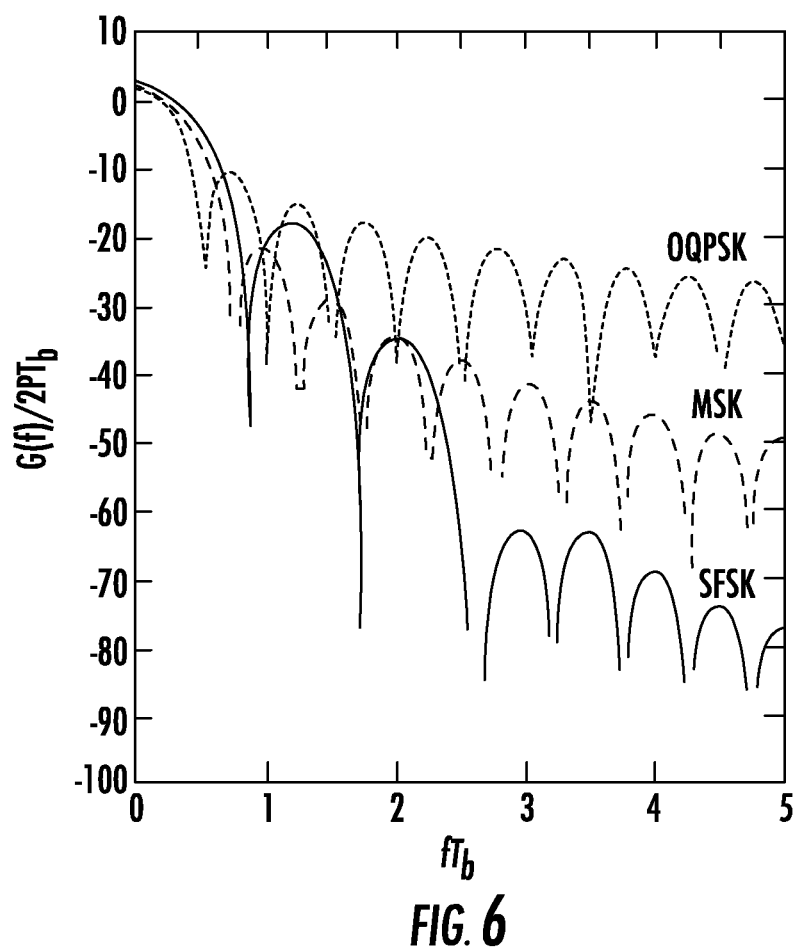
FIG. 6 is a graph comparing the equivalent baseband power spectral densities of offset quadrature phase shift keyed (OQPSK) and slow frequency shift keyed (SFSK) waveforms with a minimum-shift keyed (MSK) waveform.
Figure 7:
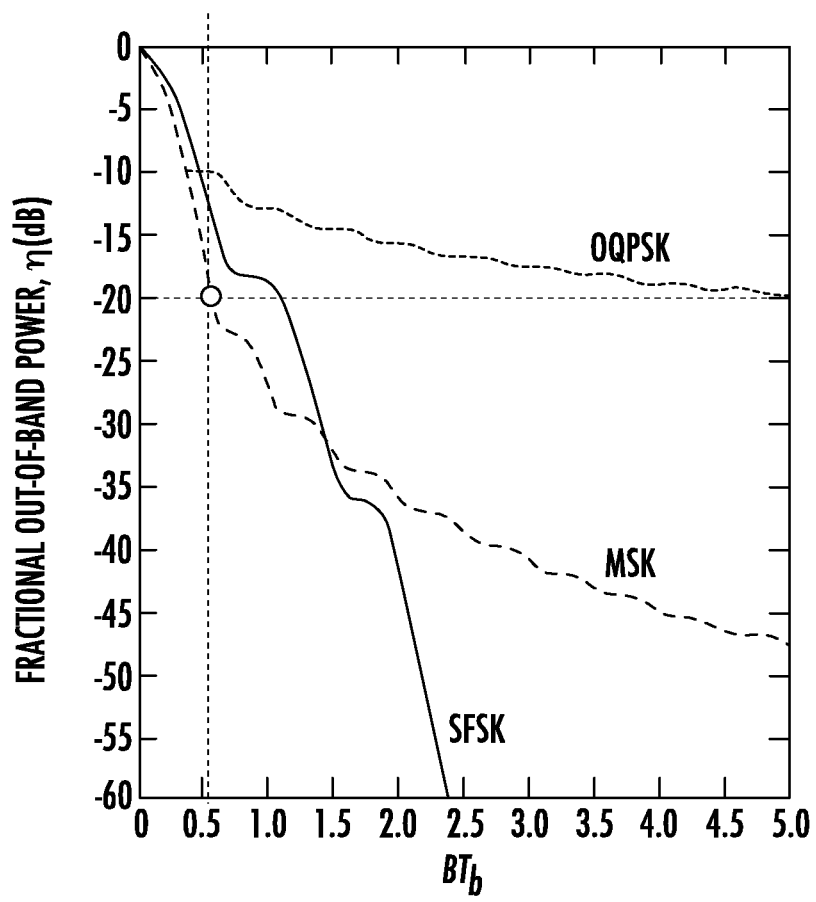
FIG. 7 is a graph showing the cumulative out-of-band (GOB) power for those waveforms of FIG. 6.

Referring now to FIGS. 6 and 7, there are illustrated graphs showing how the MSK spectral shaping meets the 1% rule as described above. FIG. 6 illustrates a comparison of the equivalent baseband power spectral densities of the MSK (minimum-shift keying), OQPSK (offset quadrature phase shift keying), and SFSK (slow frequency shift keying) RF signals relative to the center frequency of about 100 kHz (marked as 0 along the chart). In FIGS. 6 and 7, Tb corresponds to the duration of the symbol, and thus multiplying the frequency axis values by Tb is equivalent to normalizing the frequency values by the symbol rate Rs (Rs=1/Tb). The three spectra shown in the graph of FIG. 6 can be compared in terms of their cumulative out-of-band (OOB) power versus frequency as shown in the graph of FIG. 7. This figure shows that 99% (−20 dB point) of the power of the MSK RF signal is contained within the one-sided baseband bandwidth (normalized by Rs) value of 0.55. Since the one-sided unnormalized 99% Out-of-Band (COB) bandwidth is 0.55 Rs, (which must be <10 kHz to meet to meet the spectral power constraint), then Rs=10 kHz/0.55=18182 symbols/second. Since for MSK Rb=Rs (unlike for QPSK), the raw bit rate is Rb=18.18 kbps. FIG. 7 shows that MSK is the best modulation choice to meet the 99% spectral constraint at the highest possible data rate, compared to unshaped OQPSK or SFSK. However, applying RRC shaping to OQPSK or SFSK may significantly improve their COB power containment.

This long range navigation system employing this new waveform as described also supports privatized service, e.g., a tiered service. Data encryption may be applied to aid in establishing the tiered service to different uses, for example, advanced encryption standards (AES) or non-linear feedback shift registers (NFSR) instead of linear feedback shift registers (LFSR) to generate the PN (pseudonoise) sequence. The RF transmitters can include PN sequence generators as known to those skilled in the art that generate the sequence of pseudorandom binary numbers for the direct sequence spread spectrum (DSSS) RF signal.

There are advantages in replacing the eLORAN pulse waveform as illustrated in FIGS. 2 and 3 with the Time Division Multiplexed (TDM) DSSS RF waveform that employs MSK or shaped BPSK/QPSK with root-raised-cosine filtering using the conventional LORAN 100 kHz carrier. The peak power required at a transmitter is reduced because less expensive high power amplifiers (HPAs) and antenna are required. The average power required at the RF transmitter station 22 is reduced and the peak-to-average power ratio (PAPR) is reduced. A PN-based eLORAN type data channel is supported by inverting groups of PN chips. Also, privatization is supported since the DSSS RF signal that is spectrally shaped provides for tiered levels of positioning, navigation and timing (PNT) service to users. The DSSS RF signal also maximizes the efficient use of the allocated bandwidth by the spectral shaping via the root-raised-cosine filtering. The utilization of the received signal power is maximized, instead of using only 5% of the power as in the conventional eLORAN pulse waveform shown in FIGS. 2 and 3. Many sky waves that may contaminate and distort any received ground wave signal are also reduced, together with man-made interference, the cross-rate interference (CRI) from adjacent LORAN chains, and the continuous wave interference (CWI) from adjacent LORAN chains.

Figure 8:
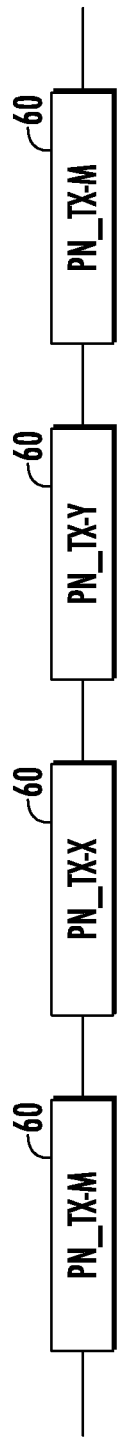
FIG. 8 is an illustration of the timing of the pulse sequence for the DSSS RF signal in accordance with an example embodiment.
Figure 9:
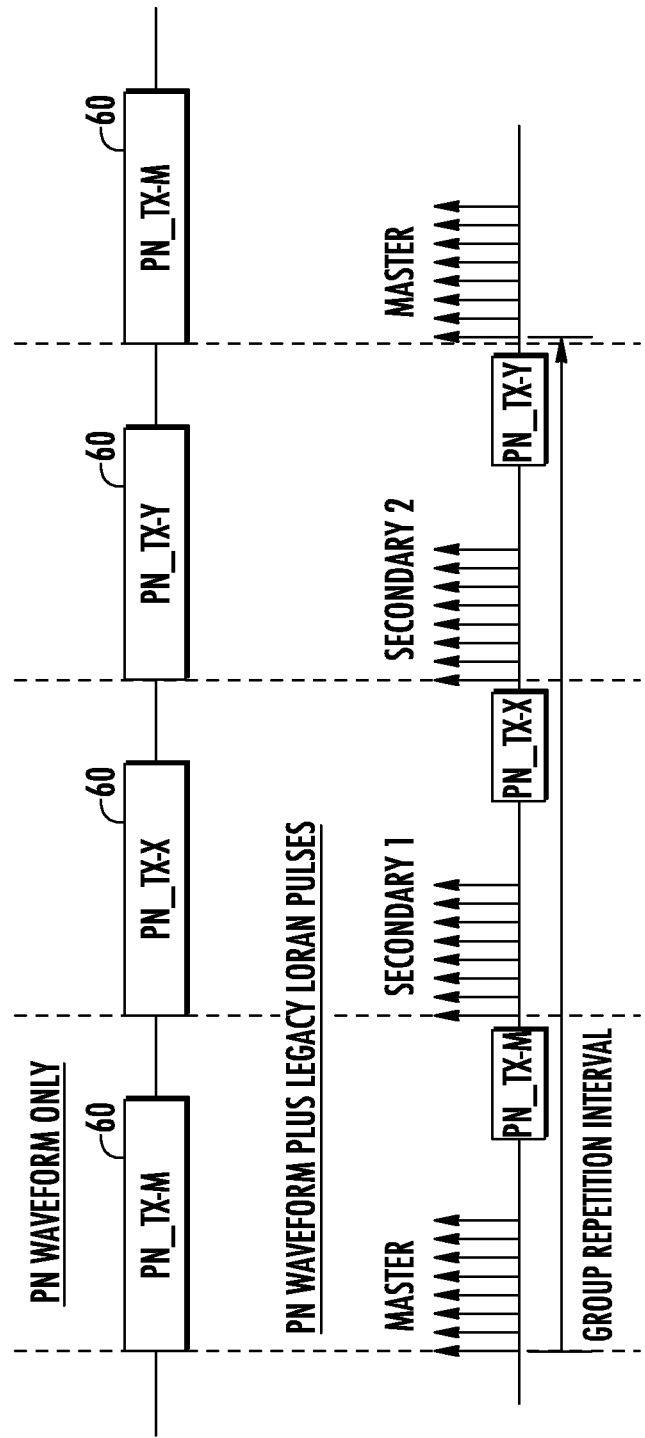
FIG. 9 is another illustration similar to FIG. 8 and comparing the timing for the DSSS RF signal and the RF signal having legacy eLORAN pulses.

The root-raised cosine (RRC) filtering of the modulated symbols ensures compliance with ITU (International Telecommunication Union) constraints. This spectrally shaped DSSS RF signal can also be made backward-compatible with existing eLORAN systems by pairing PN slots with existing conventional eLORAN pulses as best shown in the pulse pattern comparison in FIGS. 8 and 9. In FIG. 8, PN waveform transmissions 60 from each RF transmitter station 22 are time slotted in a time division multiplexed (TDM) sequence to avoid the very high dynamic range issue due to the Near-Far problem common to CDMA systems. FIG. 9 illustrates in the top section the PN waveform only and in the lower section, the PN waveform plus the legacy eLORAN pulses, showing the group repetition interval (GRI). The time axis is not to scale, but the drawing illustrates incorporated legacy pulses such as eLORAN pulses.

Encryption may be used to aid in providing a multiple-tiered positioning, navigation and timing (PNT) service capability in conjunction with fixed additional secondary factor (ASF) maps for each RF transmitter station 22 contained within each movable RF receiver unit 36. Multiple-tiered PNT service capability could be provided by encrypting any dynamic ASF corrections that are broadcast to users of different movable RF receiver units 36 via the LORAN data channel (LDC) as determined from various reference stations 42 as shown in FIG. 1. Two ASF encryption approaches may be employed to provide several tiers of service, such as encrypting fixed ASF maps or encrypting dynamic ASF corrections. Different levels of PNT performance or precision in location can be associated with different levels of service.

It is also possible to provide different levels of service by enabling different encryption keys and accessing different levels of ASF precision such as low, medium or high precision for each of the dynamic and/or fixed ASF correction values. The PN sequences used for encryption could be modulo-2, for example, as provided by a shift register and added to selected portions of the ASF correction values to control the class of service. This approach can provide a selectable number of least significant bits (LSBs) for each ASF value, whether fixed or dynamic. The encryption could also be provided using a non-linear feedback shift register (NLFBSR) configuration or by other techniques, for example, AES (advanced encryption standard) as a National Institute of Standards and Technology (NIST) standard.

The DSSS RF signal uses a high chip rate time-domain PN sequence, which when multiplied by a time sequence of samples from a noise or interference source, yields little or no correlation, and thus, provides interference rejection of undesired signals. For example, when multiplying a PN sequence with a continuous wave tone (CWI), the result is that the zero-bandwidth carrier power is spread across a wide bandwidth that is on the order of the PN chip rate. Because each RF transmitter station will use a different PN sequence, the interference (CRI) from neighboring RF transmitter stations 22 and adjacent chains may be suppressed. For example, a 10 kcps chip rate and a one (1) second sequence duration affords about 40 decibel (dB) rejection of signals from other RF transmitter stations 22. Some protection against sky wave interference is provided, depending on the phase and phase jitter due to sky wave propagation. Because the estimation of the signal time-of-arrival (TOA) in the long range navigation system that uses this PN sequence waveform relies heavily upon the correlation of the received waveform with an ideal replica stored in the RF receiver unit 36, the processing gain resulting from the correlation significantly reduces interference from CRI, CWI, sky waves and man-made interference sources.

The employment of the direct sequence PN spread spectrum combined with root-raised-cosine filtering, or MSK modulation, for spectral containment, allows a more efficient LORAN type signal such as the DSSS RF signal while remaining compliant with the ITU worldwide LORAN bandwidth allocation in which 99% of the transmit power is within the 90-110 kHz bandwidth. This RF signal allows privatization and provides a tiered service capability, reduces the peak-to-average power requirement at each RF transmitter station, reduces the average power requirements at each RF transmitter station 22, and reduces the interference (CRI) from both conventional and PRN-based systems while reducing continuous wave (CW) and man-made interference susceptibility, and reducing sky wave interference susceptibility.

Figure 10:
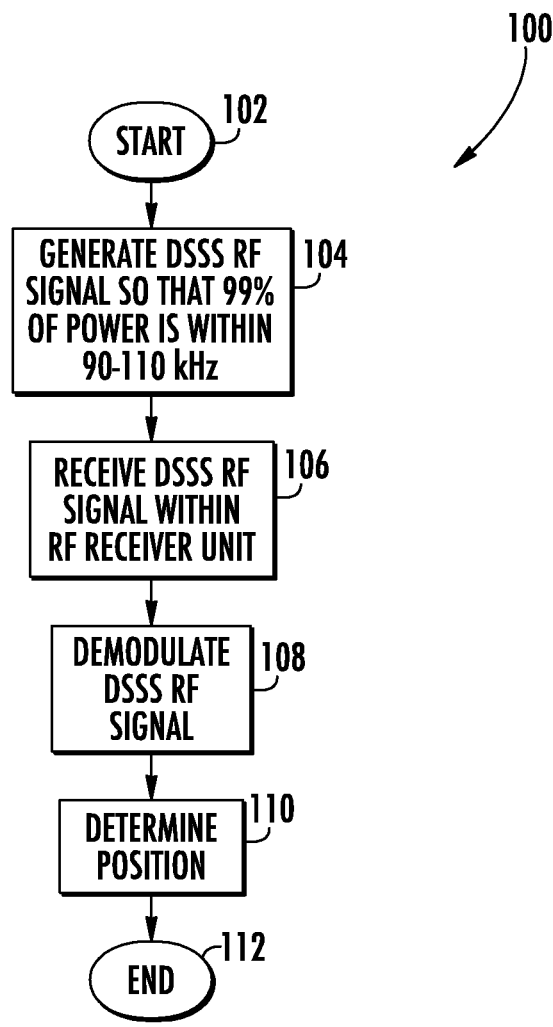
FIG. 10 is a flow diagram illustrating method aspects associated with the long range navigation system in accordance with an example embodiment.

Referring now to FIG. 10, there is illustrated a flow diagram generally at 100, illustrating method aspects associated with the long range navigation system in accordance with an example embodiment for a plurality of RF transmitter stations 22, each comprising the RF transmitter 26 and an RF modulator 27 coupled to the RF transmitter. The method begins (Block 102) and includes generating at a plurality of RF transmitter station 22 a direct sequence spread spectrum (DSSS) RF signal that is spectrally shaped so that 99% of power from the RF transmitter is within the frequency range of 90-110 kHz (Block 104).

A movable RF receiver unit 36 receives the plurality of RE signals (Block 106) and demodulates the DSSS RF signal (Block 108). The movable RF receiver unit processes the data from the demodulated DSSS RF signals to determine the position of the movable RE receiver unit (Block 110). The process ends (Block 112).

The long range navigation system 20 as described uses similar technology and components as a conventional eLORAN system and the system may incorporate eLORAN legacy waveforms, and thus, operate in conjunction with an eLORAN system. For purposes of explanation and description, an eLORAN system is described with its basic functionality, which may also be applied with the long range navigation system 20 using the generated DSSS RF signal that is spectrally shaped so that 99% of the power from the RE transmitter is within the frequency range of 90-110 kHz. This is accomplished in an example using the MSK modulation or the shaped BPSK/QPSK with the root-raised-cosine filtering.

The long range navigation system 20 will operate as a positioning, navigation and timing (PNT) service used for aviation, maritime and land-mobile vehicle navigation, as well a fixed station timing for users. As a location and timing system, it may complement the Global Navigation Satellite Systems (GNSS). The DSSS RF signal transmissions may be synchronized to an identifiable, publicly-certified source of coordinated universal time (UTC) independent of the GNSS, and thus, may operate independently of the GNSS. The system 20 includes an additional data channel that may be similar to the more conventional eLORAN data channel on the transmitted signal. This data channel may transmit application-specific corrections, warnings and signal integrity information, including station specific data such as station identification and differential corrections and non-station specific data such as almanac information, including reference station latitude, reference station longitude, and a reference station correction list.

The system 20, similar to eLORAN legacy systems, may include Primary Factor (PF) data, Secondary Factor (SF) data, and Additional Secondary Factors (ASF) data to allow optimum performance in the RF receiver units 36. The primary factor (PF) data may account for the time of propagation of the DSSS RF signals through the atmosphere based on the speed of light. The secondary factor (SF) may account for the difference in propagation time for the DSSS RF signal originating from a RF transmitter station 22 and propagating its signal over an all seawater path, rather than only through the atmosphere. The Additional Secondary Factor (ASF), on the other hand, is the extra delay based on the time-of-arrival (TOA) of the DSSS RF signals due to propagation over a non-homogenous, rough land surface path, such as elevated terrain, as opposed to over ocean water. This delay can be significant and usually each RF receiver unit 36 makes a rough estimate to achieve accuracy in tens to hundreds of meters. The ASF data can vary spatially and temporally, and thus, ASF grid and differential corrections may be used to account for the temporal and spatial variations of radio wave propagation velocity. Differential corrections that are established by reference stations 42 may be used to compensate for the lack of accuracy with standard ASF maps.

Usually a service provider publishes a table of values as a map with an ASF grid for a nominal ASF to increase the accuracy of RF receiver units 36. An ASF grid may be stored at each RF receiver unit 36, indicating the relative local variations of the ASF relative to the nominal value for the region, and may be provided at intervals that are in the order of hundreds of meters. The differential corrections received from the reference stations 42 may be used to account for the residual ASF that is not corrected for by the ASF grid when an RF receiver unit 36 is in the vicinity of reference stations 42, for example, when located in a crowded metropolitan area or near an important seaport where numerous reference stations 42 would be incorporated into the system 20.

In accordance with a non-limiting example, each RF receiver unit 36 may include ASF correction curves, e.g., look-up tables, corresponding to each RF transmitter station 22. Data corresponding to these correction curves is used to determine a position corrected from the ASF data, which is based upon the different geographical positions at different times for each different geographical position. This additional ASF data may compensate for different times of day and different days and seasons, such as each month, and the overall position accuracy of an RF receiver unit 36 is improved when those dynamic ASF corrections received from reference stations 42 are unavailable or an RF receiver unit is outside the reference station's coverage area, usually defined as a circle having about a 30 to 35 kilometer radius.

There now follows further description for the general operation of the RF long range navigation system 20 described above, which may include eLORAN legacy capability. Common messages may be transmitted among the RF transmitter stations 22 and may include encryption keys to encrypt messages. These keys are typically changed frequently. In some systems, the keys may be changed daily and in other systems the keys may be changed even for different messages. Common messages may also include receiver control messages, broadcast messages and almanac information, which may include reference station latitude, reference station longitude and reference station correction lists. Other data in the common messages may include station identification data, differential RF signal corrections, and the UTC time. The differential corrections may include data related to time differential corrections and position differential corrections.

The long range navigation system 20 may include accommodation for a medium GRI (Group Repetition Interval), which corresponds to the time duration of the repetition of the sequence of pulses, and may include a sequence of timing pulses as master and secondary pulses. Generally, the group repetition interval (GRI) corresponds to the specified time interval for all RF transmitter stations 22 of a chain to transmit their pulse groups. For each chain, a minimum group repetition interval is selected of sufficient duration to provide the time for each RF transmitter station 22 to transmit its pulse group and an additional time period between each pulse group so that signals from two or more RF transmitter stations do not overlap in time within the coverage area. The group repetition interval is normally calculated in tens of microseconds and given a whole number designation as a standard. For example, the group repetition interval having 69,950 microseconds duration corresponds to the standard as "6995," which, for a certain application of the LDC can produce 143 messages over two minutes. This eLORAN data channel has a low data rate usually of about 50 to 100 bits per second and provides these multiple messages to a user operating a RF receiver unit 36 to support the accuracy, integrity and availability requirements in the system 20.

There now follows further details of the general operation of the long range navigation system 20 with its plurality of RF transmitter stations 22, and their cooperation with the reference stations 42. The control station 30 and the reference stations 42 do not interfere with the timing control of any transmitted signals, and the reference stations 42 as noted before may provide augmentation data and may provide real-time corrections to published ASF (Additional Secondary Factor) maps for a complete maritime or other terrestrial coverage area, and provide grid data with nominal propagation corrections per RF transmitter station 22. Thus, a user operating one or more RF receiver units 36 may apply both the ASE's from the map and any differential corrections received over the data channel to improve positioning accuracy. A reference station 42 will calculate and transmit phase corrections continuously. As noted before, the system 20 signal structure is between a 90 and 110 kHz frequency band and with an RE signal usually at about a 100 kHz carrier frequency. The RF signal usually has groups of eight to ten pulses that are spaced about 1 millisecond in a TDMA structure. The transmission of groups repeats every group repetition interval. As many as five different RF transmitter stations 22 may share the same group repetition interval to form a chain with a master and secondary transmission. In a legacy eLORAN system, the signal envelope shape identifies a reference of zero-crossing, which is synchronized to the UTC. The transmitted signals may be phase coded 0 or 180° for master/secondary identification and mitigation against multiple hop sky waves. The long range navigation system with its DSSS spectrally shaped RF signal provides advantages without the zero crossing.

As a non-limiting example, those skilled in the art will understand that different implementations of the data channel may exist and incorporate legacy eLORAN, such as a three-state pulse position modulation known as the Eurofix modulation system that is standardized by the RTCM and ITU, a 9th pulse modulation system or a $9^{th}$-$10^{th}$ pulse position modulation system. The first two modulation systems provide equal data rates of approximately 20 to 50 bps, while the third provides approximately 100 bps. All modulation systems are protected by Reed-Solomon forward error correcting code to counter the effects of noise. The Eurofix modulation system has a pulse position modulation of pulses 3 . . . 8 by +1, 0, −1 microseconds, while the $9^{th}$ and $9^{th}$-$10^{th}$ pulse position modulation systems have the additional $9^{th}$ or $9^{th}$ and $10^{th}$ pulses capable of being shifted by 32 possible delays between 0 and 158.75 microseconds. In the Eurofix modulation system as noted before, the pulses are pulse position modulated (ppm) plus or minus (one) 1 microsecond. There are about 729 possible modulation patterns and the pulse position modulated encoding uses about 128 of a possible 141 balanced patterns to represent 7 bits of data per group repetition interval. The data rate may be about 70 to 175 bits per second based on the group repetition interval and uses Reed-Solomon encoding forward error correction. For an example, the Eurofix message length is fixed at about 210 bits having 37-bit words.

With the 9th pulse modulation system, the pulse is inserted 100 microseconds after the 8th pulse and may use 32-state pulse-position modulation to encode the data at a data rate of about 5 bits per GRI.

The long range navigation system 20 and the legacy eLORAN may include the differential corrections transmitted within the data channel, which may contain ASF phase correction data from a differential reference station 42. The almanac information may include the reference station latitude, reference station longitude, and a reference station correction list as noted before. The reference station correction list may have messages that contain the signal ID codes for the corrections from a particular differential reference station 42.

In one example, as understood by those skilled in the art, it is possible that the Eurofix modulation system may have 56 bits as a DGPS message. A message may have 14 bits as a cyclic redundancy check for data link integrity, and 140 bits for the Reed-Solomon parity. In addition, 210 bits may correspond to 30 GRI's of 7 bits per message, and thus, correspond to about 1.2 to about 3 seconds per message. The 9th pulse modulation system may have a 32 state pulse position modulation in another example and 5 bits/GRI corresponding to 3 bits phase and 2 bits envelope and phase.

In operation, the RF receiver units 36 may have a position calculation based on three or more pseudo ranges to three or more RF transmitter stations 22. An RF receiver unit 36 will measure the signal arrival times, which are converted to pseudo ranges by multiplication with the signal's propagation velocity. It should be understood that this propagation velocity is not equal to the speed of light in a vacuum, but depends on the medium the signals travel in and over, such as through air, over sea, over land, or over mountains. The calculations take into effect the true range, the primary factor (PF), the secondary factor (SF), and the additional secondary factor (ASF), together with the variation in those factors and any remaining measurement errors. The receiver clock bias (error) is determined in the process of the position calculation. As noted before, the primary factor delay accounts for the difference between propagation of the signal in the earth's atmosphere as opposed to in free space and the secondary factor delay accounts for signal propagation over sea water. The primary factor and secondary factor are known functions of path length and an RF receiver unit 36 uses a model to calculate the PF and SF delays.

The additional secondary factor (ASF) delay build-up depends on the type of soil and other factors and is the total cumulative delay the signal experiences over sections with different ground conductivity. An ASF map may be provided for an operating area as a grid with a survey of nominal ASF's for each RF transmitter station 22. Not taking the ASF's into account could result in positioning errors of several hundred meters up to kilometers. ASF's are published as a map with an ASF grid for each RF transmitter station 22.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A long range navigation system comprising:
a plurality of radio frequency (RF) transmitter stations at fixed geographical locations, each RF transmitter station comprising
an RF transmitter, and
an RF modulator coupled to said RF transmitter and configured to generate a direct sequence spread spectrum (DSSS) RF signal being spectrally shaped so that 99% of power from said RF transmitter is within the frequency range of 90-110 KHz, wherein the DSSS RF signal is time slotted in a time division multiplexed (TDM) sequence and includes pseudo-random (PN) slots that are paired with existing long range navigation pulses; and a plurality of movable RF receiver units, each movable RF receiver unit comprising
an RF receiver, and
a demodulator coupled to said RF receiver and configured to demodulate the DSSS RF signal to determine a position of said movable RF receiver unit.

2. The long range navigation system of claim 1 wherein said RF modulator is configured to implement minimum-shift keying (MSK).

3. The long range navigation system of claim 1 wherein said RF modulator is configured to implement phase shift keying (PSK).

4. The long range navigation system of claim 1 wherein said RF modulator is configured to implement binary phase shift keying (BPSK).

5. The long range navigation system of claim 4 wherein said RF modulator is configured to further implement a root-raised-cosine filtering.

6. The long range navigation system of claim 1 wherein said RF modulator is configured to implement quadrature phase shift keying (QPSK).

7. The long range navigation system of claim 6 wherein said RF modulator is configured to further implement a root-raised-cosine filtering.

8. The long range navigation system of claim 1 wherein each RF transmitter station comprises encryption circuitry cooperating with said RF modulator; and wherein at least one of said movable RF receiver units comprises decryption circuitry cooperating with said RF demodulator.

9. The long range navigation system of claim 1 wherein each RF transmitter station further comprises a legacy RE modulator cooperating with said RF transmitter to generate legacy eLORAN signals; and wherein at least one of said movable RF receiver units comprises a legacy RE demodulator cooperating with said RF receiver.

10. A radio frequency (RE) transmitter station for a long range navigation system comprising:
an RF transmitter; and
an RF modulator coupled to said RF transmitter and configured to generate a direct sequence spread spectrum (DSSS) RF signal being spectrally shaped so that 99% of power from said RF transmitter is within the frequency range of 90-110 KHz, wherein the DSSS RE signal is time slotted in a time division multiplexed (TDM) sequence and includes pseudo-random (PN) slots that are paired with existing long range navigation pulses.

11. The long range navigation system of claim 10 wherein said RF modulator is configured to implement minimum-shift keying (MSK).

12. The long range navigation system of claim 10 wherein said RF modulator is configured to implement phase shift keying (PSK).

13. The long range navigation system of claim 10 wherein said RE modulator is configured to implement binary phase shift keying (BPSK).

14. The long range navigation system of claim 13 wherein said RF modulator is configured to further implement a root-raised-cosine filtering.

15. The long range navigation system of claim 10 wherein said RF modulator is configured to implement quadrature phase shift keying (QPSK).

16. The long range navigation system of claim 15 wherein said RF modulator is configured to further implement a root-raised-cosine filtering.

17. The long range navigation system of claim 10 wherein each RF transmitter station comprises encryption circuitry cooperating with said RF modulator.

18. The long range navigation system of claim 10 wherein each RF transmitter station further comprises a legacy RF modulator cooperating with said RF transmitter to generate legacy eLORAN signals.

19. A method for long range navigation control for a plurality of RF transmitter stations at fixed geographical locations, and each comprising an RF transmitter and an RF modulator coupled to the RF transmitter, the method comprising:
    operating the RF modulator to generate a direct sequence spread spectrum (DSSS) RF signal being spectrally shaped so that 99% of power from the RF transmitter is within the frequency range of 90-110 KHz, wherein the DSSS RF signal is time slotted in a time divisional multiplexed (TDM) sequence and includes pseudo-random (PN) slots that are paired with existing long range navigation pulses; and
    receiving the DSSS RF signal within a plurality of movable RF receiver units, each RF receiver unit comprising an RF receiver and a demodulator coupled to the RF receiver and configured to demodulate the DSSS RF signal to determine a position of the movable RF receiver unit.

20. The method of claim 19 wherein the RF modulator is configured to implement minimum-shift keying (MSK).

21. The method of claim 19 wherein the RF modulator is configured to implement phase shift keying (PSK).

22. The method of claim 19 wherein the RF modulator is configured to implement binary phase shift keying (BPSK).

23. The method of claim 22 wherein the RF modulator is configured to further implement a root-raised-cosine filtering.

24. The method of claim 19 wherein the RF modulator is configured to implement quadrature phase shift keying (QPSK).

25. The method of claim 24 wherein said RF modulator is configured to further implement a root-raised-cosine filtering.

26. The method of claim 24 wherein each RF transmitter station comprises encryption circuitry cooperating with said RF modulator.

27. The method of claim 24 wherein each RF transmitter station further comprises a legacy RF modulator cooperating with said RF transmitter to generate legacy eLORAN signals.

* * * * *